*INVENTORS*
LYLE R. FERNALD
CLARENCE E. HODSON

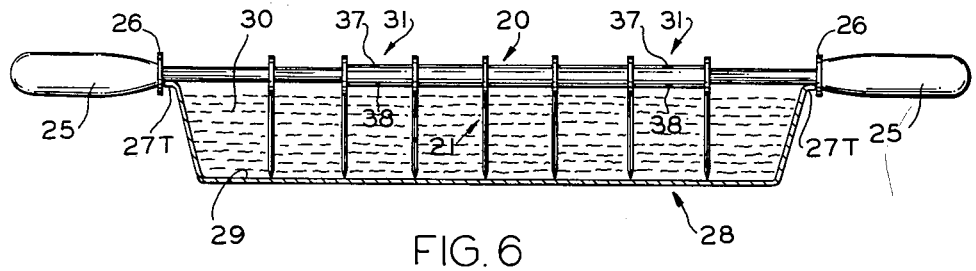
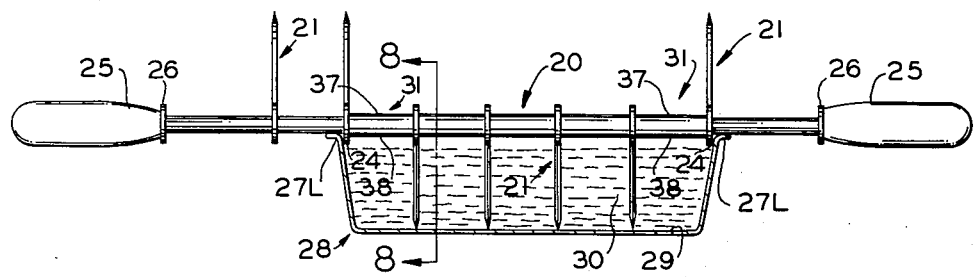
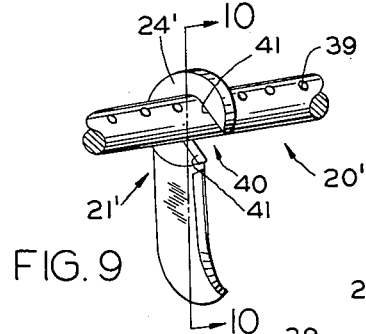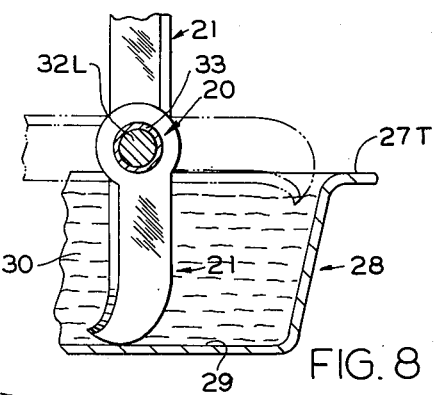
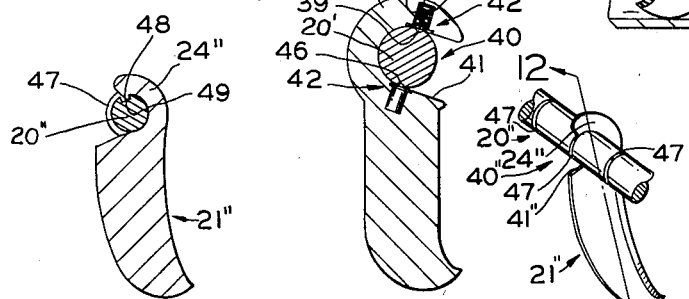

United States Patent Office 2,986,815
Patented June 6, 1961

1

2,986,815
MULTIPLE-BLADE FOOD CUTTER
Lyle R. Fernald and Clarence E. Hodson,
Bakersfield, Calif.
Filed June 21, 1960 Ser. No. 37,767
1 Claim. (Cl. 30—304)

The present invention consists of a multiple-blade food cutter adapted for sliding cooperation successively in two mutually perpendicular directions with respect to two different sets of parallel edges of a substantially rectangular pan containing food, whereby to mutually perpendicularly cut the food into a plurality of substantially rectangular sections. This is particularly advantageous when foods such as cakes, cobblers, gelatin salads, gelatin desserts, or the like, are prepared in a large rectangular pan. In the past it has been necessary to manually and individually cut a large rectangular sheet of such prepared food in order to remove one or more servings. This is a time-consuming job and, furthermore, may result in the servings being of different sizes. However, when the novel multiple-blade food cutter of the present invention is used, the cutting operation is performed very rapidly and all servings are of substantially equal size.

It is an object of the present invention to provide a multiple-blade food cutter of the character referred to above wherein certain of the food cutter blades can be controllably effectively inactivated with respect to the remainder of said food cutter blades to allow food to be sliced between pan edges which are spaced apart by different distances.

It is a further object to provide a multiple blade food cutter of the character referred to above, including blade mounting means adjustably, removably, and lockably mounting the plurality of blades on a longitudinal shaft means for longitudinal positional adjustment therealong whereby to permit food sections of different size to be cut by the device.

It is a further object of the present invention to provide a multiple blade food cutter of the character referred to above, which is of extremely simple, cheap, foolproof construction such as to be conducive to widespread use thereof.

Further objects are implicit in the detailed description which follows hereinafter and will be apparent to persons skilled in the art after a careful study thereof.

For the purpose of clarifying the nature of the present invention, three exemplary embodiments of the present invention are illustrated in the hereinbelow-described figures of the accompanying drawings and are described in detail hereinafter.

FIG. 6 is a view taken in the direction of the arrows 6—6 of FIG. 5.

Figure 1:
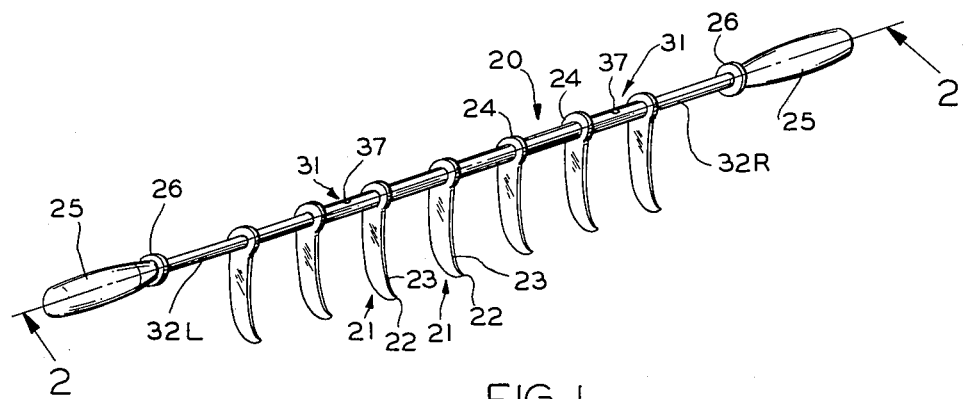
FIG. 1 is an oblique view of one exemplary embodiment of the multiple-blade food cutter of the present invention with all of the blades in operative position.
Figure 2:
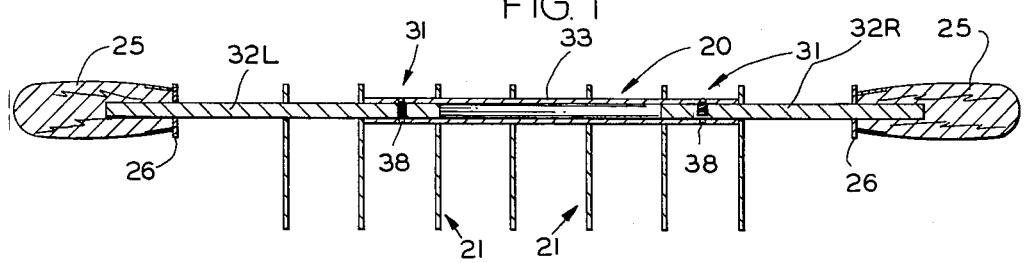
FIG. 2 is a longitudinal central sectional view taken in the direction of the arrows 2—2 of FIG. 1.
Figure 3:
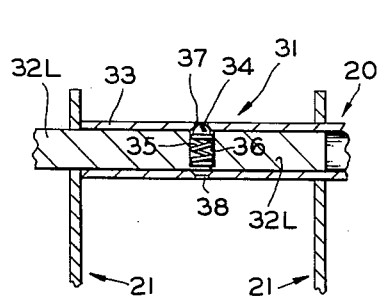
FIG. 3 is an enlarged fragmentary sectional view showing the left rotative movement immobilizing means for locking all of the blades in similar operative positions or for locking certain of them in a repositioned effectively inactivated position.

FIG. 7 is a view comprising a transverse section of the food pan taken at right angles to the plane of FIG. 6 after the multiple blade food cutter has been lifted from the edges of the food pan and placed in operative relationship with respect to the parallel longitudinal edges of the food pan for cutting the food into a plurality of longitudinal slices, which, together with the previously cut transverse slices, effectively cuts the food into a plurality of square sections. It should be noted that since the food pan is narrower in the transverse direction, the operation just described has been made possible by inactivating three of the food cutter blades in FIG. 7 by effectively repositioning the two extreme left blades and the extreme right blade of the multiple-blade food cutter in a manner such as to effectively render them inactive. This is accomplished by the left and right controllably operable blade inactivating means (comprising, in this form of the invention, repositioning means) such as the left one thereof shown in detail in FIG. 3 before such repositioning and shown in detail in FIG. 4 after such repositioning.

FIG. 8 is a fragmentary sectional view taken in the direction of the trrows 8—8 of FIG. 7.

FIG. 9 is a fragmentary oblique view illustrating a slightly modified form of the invention wherein each of the plurality of food cutter blades is controllable removable and controllably adjustably positionable along the longitudinal shaft in a plurality of steps whereby to effectively vary the spacing between adjacent blades for varying the size of food sections cut thereby.

FIG. 10 is a sectional view taken in the direction of the arrows 10—10 of FIG. 9.

FIG. 11 is a fragmentary oblique view illustrating another slightly modified form where each of the plurality of food cutter blades is controllably adjustably positionable along the longitudinal shaft in a plurality of steps and is controllably removable at will for effectively inactivating any desired number of the blades in order to compensate for variations in the width of a pan carrying food which is to be cut.

FIG. 12 is a sectional view taken in the direction of the arrows 12—12 of FIG. 11.

Figure 4:
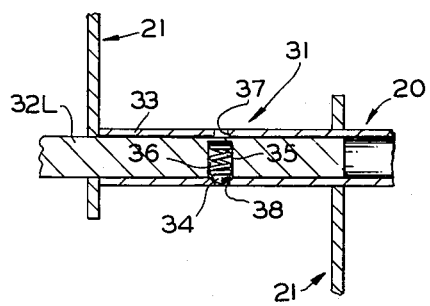
FIG. 4 is a view similar to FIG 3, but shows the apparatus after the two left blades shown in FIG. 2 have been rotatably moved into upwardly extending position so as to be effectively rendered inactive with respect to the remaining downwardly directed blades carried by the center of the apparatus shown in FIG. 2.
Figure 5:
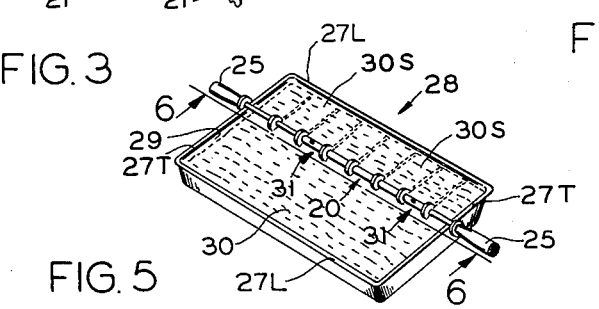
FIG. 5 is a reduced-size oblique view showing the multiple blade food cutter in operative relationship with respect to parallel top transverse or end edges of a rectangular food pan in a position such that it can be transversely drawn thereacross in a manner such that the multiple food cutter blades will transversely cut food within the interior of the pan into a plurality of transverse strips.

Referring to FIGS. 1–8 for exemplary purposes one illustrative embodiment of the invention comprises a multiple-blade food cutter consisting of longitudinal shaft means, indicated generally at 20, provided with a plurality of substantially parallel projecting cutter blades, indicated generally at 21, each having a penetrating point 22 and cutting edge means 23 extending from said point to the junction portion 24 of said blade means and the longitudinal shaft means 20. The longitudinal shaft means is provided at opposite ends with manually graspable handle members 25. Also, the longitudinal shaft means 20 is provided with guide means 26 adjacent the inner ends of each of the handle members 25 and adapted for slidable guiding cooperation with respect to the parallel top transverse or end edges 27T of a rectangular food pan, indicated generally at 28, when the longitudinal shaft means 20 is positioned across said transverse top end edges 27T and drawn transversely therealong by said handle members 25 with the multiple food cutter blades 21 extending downwardly into the interior 29 of the food pan 28 for transversely slicing food 30 contained therein into a plurality of transverse strips, as indicated at 30S in FIG. 5. It should be noted that after completion of the transverse food slicing operation just described and shown in detail in FIGS. 5 and 6, the entire multiple-blade food cutter may then be removed from the pan and, after repositioning of the two left food cutter blades 21 and the one right food cutter blade 21 into upwardly extending effectively inactivated position shown in full in FIG. 7 and in partial detail in FIG. 4, the longitudinal shaft 20 is moved downwardly into engagement with the parallel top longitudinal edges 27L of the rectangular food pan 28 for longitudinal sliding movement therealong whereby to make multiple longitudinal slices or cuts in the food 30 perpendicular to the plurality of transverse slices defining the transverse strips 30S previously cut as shown in FIGS. 5 and 6, whereby to produce a plurality of cut square sections or individual servings of the food 30. As mentioned above, in order to do this, it is necessary to inactivate the two left food cutter blades 21 and the one extreme right food cutter blade 21 if the device is to cooperate for longitudinal slicing with a pan of the transverse dimension shown in FIGS. 5 and 7 (although the invention is not specifically so limited). This is accomplished, in this form of the invention, by means of controllably operable blade repositioning and effectively inactivating means, indicated generally at 31. There are two such blade repositioning and inactivating means in the form of the invention illustrated in FIGS. 1-8. However, only the left one will be described in detail since it is shown in enlarged sectional detailed form in FIGS. 3 and 4. However, it should be understood that the right one is similar. In this form of the invention, the longitudinal shaft means 20 consists of rotatively engaged inner and outer sleeve sections comprising the outer sections 32L and 32R connected at their outer ends to the two handle members 25 and each carrying a certain number of the food cutter blades 21 which are to be capable of being controllably repositioned and rendered inactive. It should be noted that, in the form illustrated, the left shaft section 32L carries two such food cutter blades 21 adapted for repositioning while the right shaft section 32R carries one such food cutter blade 21 adapted for repositioning, with the remaining four central food cutter blades 21 being carried by a central section comprising a tubular sleeve 33 which receives in left and right ends thereof the left and right outer shaft sections 32L and 32R, respectively, with the controllably operable blade repositioning and effectively inactivating means 31 effectively comprising rotative movement immobilizing means for locking the two blades carried by the shaft section 32L and the one blade carried by the shaft section 32R in operative position with respect to the remaining four central blades as shown in FIGS. 1, 2, 3, 5, and 6, or for locking said two left and one right blades in effectively repositioned and inactive relationship as shown in FIGS. 4 and 7. The rotative movement immobilizing means in each case comprises a ball 34 positioned on the end of a biasing spring 35 mounted in an aperture or recess 36 in the shaft section 32L or 32R and with the ball 34 being positioned in opposition to a smaller aperture 37 defined in the central tubular section 33, whereby the biasing spring 35 normally biases the ball 34 partly into the aperture 37 so as to rotatively immobilize or lock the inner shaft section 32L or 32R with respect to the central tubular sleeve shaft section 33 either in the normal fully active poistion shown in FIG. 3 or in the 180-degree reversed effectively inactivated position shown in FIG. 4, wherein the shaft section 32L, the spring 35, and the ball 34 have been rotated 180 degrees within the central tubular shaft section 33 into a position such that the ball 34 is now partially forced into and retained within another aperture 38 in the tubular sleeve type central section 33. This may be done at both ends whereby to produce the arrangement clearly shown in FIG. 7 wherein three of the blades have been effectively rendered inactive, thus allowing the remaining four blades to be inserted into the food pan 28 across the narrow width thereof for longitudinal slicing movement along the length thereof. It should be noted that in this form, the junction portions 24 of the two innermost effectively inactive blades 21 act as guide members sliding along the inner longitudinal edges 27L of the food pan 28.

FIGS. 9 and 10 illustrate, in fragmentary form, a slight modification of the invention wherein the shaft means, indicated generally at 20', includes a plurality of apertures or recesses 39 therealong, each adapted to removably and lockably mount any of the plurality of blades, one of which is shown at 21', at various longitudinal locations along the shaft means 20' whereby to make it possible to adjust the spacing between adjacent blades 21' so as to adjust the size of food sections cut by the device. In this modification, blade mounting means for providing this feature of the invention are included, as indicated generally at 40, and take the form of the base portion 24' of the blade 21' which has a part defining a transverse aperture 41 adapted to removably receive and engage a portion of the longitudinal shaft means 20'. Said blade mounting means 40 also includes locking means, such as indicated at 42, for cooperably interconnecting the longitudinal shaft means 20' and the base portion 24'. In the specific form illustrated, each of the locking means 42 includes an aperture defined in one of said portions, such as any of the plurality of apertures 39 in the shaft means 20' and a locking insert member 43 carried by the other of said portions and, in the example illustrated, comprising a ball biased by a biasing spring 44 carried in a recess 45 in the base portion 24' of the blade 21'. It should be noted that a similar locking means 42 is carried by the base portion 24' of the blade 21' in opposition to the upper one just described for cooperation with a similar plurality of holes 46 along the bottom of the shaft means 20' identical to the upper holes or apertures 39. This provides an arrangement whereby any of the blades can be rotated into an inactive position or removed and can also be longitudinally positionally adjusted. However, the particular blade mounting means is exemplary only and the invention is not limited thereto but may include various types of blade mounting means functionally equivalent thereto for mounting the blades for positional adjustment along the shaft means.

FIGS. 11 and 12 illustrate another slight modification wherein each of the food cutter blades, one of which is indicated generally at 21", can be controllably positionally adjusted along the length of the shaft, indicated fragmentarily at 20", by blade mounting means indicated generally at 40". In this modification, the blade mounting means 40" takes the form of a base portion 24" of the blade 21", which has a part defining a transverse aperture 41" adapted to removably receive and engage any of a plurality of slot means 47 carried by the longitudinal shaft means 20" in a manner whereby the blade 21" is firmly locked in position and is prevented from clockwise rotation, as viewed in FIG. 12, by means of an inwardly projecting tip 48 carried by the portion 24" which extends into a notch portion 49 at the top of the slot 47. However, the arrangement is such that the food cutter blade 21" can readily be rotated in counter-clockwise direction as viewed in FIG. 12 in a manner which will easily remove the blade from the longitudinal shaft means 20", when desired.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

A multiple-blade food cutter adapted for sliding cooperation successively in two mutually perpendicular directions with respect to the edges of a pan containing food whereby to mutually perpendicularly cut the food into a plurality of rectangular sections, comprising: longitudinal shaft means provided with a plurality of similarly projecting, substantially parallel food cutter blades each having a penetrating point and cutting edge means extending from said point to the junction of said blade means and said longitudinal shaft means, said longitudinal shaft means being provided with longitudinally aligned manually graspable handle members at opposite ends thereof; guide means carried by said longitudinal shaft means adjacent to inner ends of said handle members for slidable guiding cooperation with respect to parallel top transverse edges of a rectangular food pan when the longitudinal shaft means is positioned across said transverse top edges and drawn therealong by said handle members with said multiple food cutter blades extending downwardly into the interior of the pan for transversely cutting food contained therein into a plurality of transverse strips; and controllably operable blade inactivating means for effectively inactivating certain of the outer ones of the plurality of food cutter blades whereby the remainder of the food cutter blades may be placed in cooperative relationship with food in the food pan for longitudinally cutting the food into a plurality of longitudinal strips whereby to define a plurality of rectangular cut sections of food as a result of the perpendicular transverse and longitudinal food cutting operations, said blade inactivating means comprising rotatively engaged inner and outer sleeve sections of said longitudinal shaft means including two cylindrical outer sections connected to the handles and each integrally carrying a certain number of food cutter blades which are to be controllably capable of being repositioned and rendered inactive, and a central hollow tubular section rotatably receiving therewithin the ends of the two outer cylindrical sections remote from the corresponding handles, said hollow tubular central section integrally carrying the remainder of the food cutter blades, said two outer sections and said hollow tubular central section being provided with controllably operable rotative movement immobilizing means for locking all of the blades in similar first projecting positions and for controllably unlocking same for repositioning of the blades integrally carried by the two outer sections into second oppositely directed effectively inactive positions, said controllably operable rotative movement immobilizing means comprising spring-biased ball and aperture means adjacent the rotative junction of each of the two outer sections and the hollow tubular central section and each including a ball carried by the cylindrical outer section, two oppositely positioned apertures defined in the hollow tubular central section for selective opposition to the ball, and biasing spring means normally forcing the ball into either of said apertures.

References Cited in the file of this patent

UNITED STATES PATENTS

| | | |
|---|---|---|
| 1,339,436 | Conrad | May 11, 1920 |
| 2,084,570 | Beck | June 22, 1937 |

FOREIGN PATENTS

| | | |
|---|---|---|
| 888,923 | Germany | Sept. 7, 1953 |